US012000383B2

(12) United States Patent
Blaabjerg et al.

(10) Patent No.: US 12,000,383 B2
(45) Date of Patent: Jun. 4, 2024

(54) TOWER CABLE INSTALLATION IN A WIND TURBINE TOWER

(71) Applicant: Siemens Gamesa Renewable Energy A/S, Brande (DK)

(72) Inventors: Hans Kjaer Blaabjerg, Gevded (DK); Malte Herbert Rumler, Mettingen (DE); Madhup Tiwari, Bangalore (IN)

(73) Assignee: Siemens Gamesa Renewable Energy A/S, Brande (DK)

( * ) Notice: Subject to any disclaimer, the term of this patent is extended or adjusted under 35 U.S.C. 154(b) by 335 days.

(21) Appl. No.: 17/433,170

(22) PCT Filed: Feb. 20, 2020

(86) PCT No.: PCT/EP2020/054416
§ 371 (c)(1),
(2) Date: Aug. 23, 2021

(87) PCT Pub. No.: WO2020/173794
PCT Pub. Date: Sep. 3, 2020

(65) Prior Publication Data
US 2022/0186715 A1    Jun. 16, 2022

(30) Foreign Application Priority Data
Feb. 26, 2019 (EP) .................................. 19159335

(51) Int. Cl.
*F03D 80/80* (2016.01)
*F03D 13/40* (2016.01)

(52) U.S. Cl.
CPC ............ *F03D 80/85* (2016.05); *F03D 13/40* (2016.05); *F05B 2230/61* (2013.01)

(58) Field of Classification Search
CPC ...... F03D 80/85; F03D 13/40; F05B 2230/61; F05B 2230/60; B65H 75/08; B65H 49/26;
(Continued)

(56) References Cited

U.S. PATENT DOCUMENTS 2,379,833 A * 7/1945 Sharp .................... F03D 9/28
74/381
2009/0284012 A1   11/2009 Mortensen
(Continued)

FOREIGN PATENT DOCUMENTS

CN          108999760 A      12/2018

OTHER PUBLICATIONS

PCT International Search Report and Written Opinion of International Searching Authority dated May 18, 2020 corresponding to PCT International Application No. PCT/EP2020/054416 filed Feb. 20, 2020.

*Primary Examiner* — Hoa C Nguyen
*Assistant Examiner* — John B Freal
(74) *Attorney, Agent, or Firm* — Schmeiser, Olsen & Watts, LLP (57) ABSTRACT

Provided is a method of installing a power cable in a wind turbine tower, in particular for transportation, the method including: arranging a section of the cable within the tower, the section having a length, in particular by at least an upper excess cable por-tion, greater than the tower height, by forming a cable loop within the tower, wherein an angle enclosed between a normal of a cable loop plane and the longitudinal direction of the tower is between 70° and 110°.

16 Claims, 5 Drawing Sheets

(58) Field of Classification Search
CPC ...... B65H 49/36; B65H 55/00; B65H 55/005; B65H 2701/36; E04H 12/00; E04H 12/344; Y02E 10/72
See application file for complete search history.

(56) References Cited

U.S. PATENT DOCUMENTS

| | | | |
|---|---|---|---|
| 2011/0061314 A1* | 3/2011 | Muhlhauser | F03D 80/85 52/745.18 |
| 2016/0311641 A1* | 10/2016 | Langel | B65H 75/08 |
| 2017/0097110 A1* | 4/2017 | Hamsho | F03D 80/85 |

* cited by examiner

TOWER CABLE INSTALLATION IN A WIND TURBINE TOWER

CROSS-REFERENCE TO RELATED APPLICATIONS

This application claims priority to PCT Application No. PCT/EP2020/054416 having a filing date of Feb. 20, 2020, which is based off of EP Application No. 19159335.9, having a filing date of Feb. 26, 2019, the entire contents both of which are hereby incorporated by reference.

FIELD OF TECHNOLOGY

The following relates to a method and arrangement of installing a power cable in a wind turbine tower, in particular for transportation.

BACKGROUND

In a nacelle installed on top of a wind turbine tower, a wind turbine comprises a generator, which generates electric energy upon rotation of a rotor having attached thereon plural rotor blades. The electrical output power is conveyed in a power cable running through the wind turbine tower and supplied to a sea cable or underground cable which supplies the electric energy to a utility grid.

Conventionally, the installation of the high voltage (HV) power cable in the wind turbine tower is performed at an assembly site, such as an assembly harbour before operation site installation, for example offshore installation. In the conventional method, the power cable is pulled by a hoist arranged in the top of the wind turbine tower from a drum in the bottom of the tower.

In order to provide a sufficient cable length to connect the cable system in the later installed nacelle and in order to provide sufficient cable for reconnection scenarios during service lifetime, an overlength of the cable has to be considered in the wind turbine tower and stored during offshore transport or in general during transport to the final operation site. Conventionally, the overlength of the cable may have been coiled up in the uppermost platform of the wind turbine tower.

However, it has been observed that the conventional method is not in all situations or circumstances capable of installing or storing the overlength of the cable within the wind turbine tower, partly due to an increase of the diameter of the cable. The increase of the diameter of the cable has the effect that the cable is relatively stiff and can only be bent with an increased radius of curvature. Thus, the curved cable requires increased space which may not be available at the uppermost platform of the wind turbine tower.

Thus, there may be a need for a method and arrangement of installing a power cable in a wind turbine tower, which is applicable to power cables having increased diameters, thereby supporting higher power output of the wind turbine.

SUMMARY

According to an embodiment of the present invention it is provided a method of installing a power cable in a wind turbine tower, in particular for transportation, the method comprising: arranging a section of the cable within the tower, the section having a length, in particular by at least an upper excess cable portion, greater than the tower height, by forming a cable loop within the tower, wherein an angle enclosed between a normal of a cable loop plane and the longitudinal direction of the tower is between 70° and 110°.

The power cable may for example be a high voltage power cable, capable of carrying electric power at a voltage between for example 1 kV and 100 kV, or between 10 kV and 80 kV in particular around 66 kV. The power cable may for example have a diameter (of conductors of the cable) between 50 mm and 200 mm, in particular between 115 mm and 120 mm. Due to the relatively high diameter of the power cable, the power cable may be relatively stiff such that a minimum radius of curvature may be associated with the power cable. The minimum radius of curvature may for example be within the range of 300 mm and 2000 mm, in particular between 690 mm and 1200 mm corresponding to 6 times the diameter for a fixated cable and 10 times the diameter for a free hanging cable.

The length of the section of the cable within the tower is greater than the tower height. In particular, the length of the section of the cable may be the sum of the tower height, a length of an upper excess cable portion and a length of a lower excess cable portion of the cable. The upper excess cable portion as well as the lower excess cable portion may be provided to provide sufficient tolerances of the length of the cable to allow connection to for example a nacelle power output terminal and a sea cable or underground cable after final installation of the wind turbine at the operation site. The cable loop may comprise at least a 360° turn of the cable.

The cable loop plane may not be parallel to a platform of the tower, thus may not be parallel to a plane perpendicular to a longitudinal axis of the tower. The cable loop plane may be defined as a plane from which distances of portions of the cable loop are minimal. The cable portion forming the cable loop may not exactly lie in one plane but may form a spiral. However, a cable loop plane can be defined by that plane from which distances to the cable portions forming the cable loop are minimal. The spiral of the cable loop may have a pitch for example between 0.5 m and 5 m, for example. The cable loop can be considered to be arranged such that the cable loop plane is essentially orthogonal to the longitudinal axis of the wind turbine tower. Conventional cable coils may have been arranged and may have been put on a platform of the wind turbine tower such that a normal of the conventional cable loop plane is essentially parallel to the longitudinal axis of the wind turbine tower.

Arranging the cable loop plane essentially perpendicular or orthogonal to the longitudinal axis of the wind turbine tower may allow to store a greater length of an excess portion of the cable within the wind turbine tower and may not occupy much space on a platform. Thereby, transportation of the turbine tower with the installed power cable may be facilitated or simplified. Advantageously, the size of the cable loop may be adaptable to accompany a upper excess cable portion as required. In particular, the cable loop may have a lateral size which is essentially fixed (for example defined by a support system) and may have a vertical size which may be adaptable or changeable depending on the required upper excess cable portion length. The vertical dimension or extent of the cable loop may be larger, in particular between one and ten times as large as the lateral extent of the cable loop and the vertical extent may be adaptable. Thereby, a larger upper excess cable portion may be stored within the wind turbine tower than was conventionally possible. The vertical extent of the cable loop is in particular not restricted by a diameter of the wind turbine tower or a diameter of a platform installed within the wind turbine tower, as was conventionally used for storing an excess cable portion or overlength cable portion.

The entire section of the cable may be harboured within the tower, thereby protecting the power cable in particular during transportation and also simplifying the transportation.

The longitudinal direction of the tower may be parallel to a cylinder symmetry axis or approximate cylinder symmetry axis of the wind turbine tower. When installed at a final installation site, the longitudinal direction of the tower may correspond or may be equal to the vertical direction.

The wind turbine tower may comprise in an inside several platforms for supporting components of the wind turbine tower and enabling maintenance work. The cable loop may for example be supported at or close to one of these platforms. The platform at or close to which the cable loop is arranged may be an upper platform, i.e., a platform in an upper half or even in an upper quarter of the wind turbine tower. A lower portion of the cable loop may then hang down from the platform and the vertical size of this lower portion of the cable loop may only be restricted by the distance to a next (lower) platform or other interfering equipment in the space between the upper platform and the lower platform.

According to an embodiment of the present invention, the method further comprises fixing an upper portion of the cable loop at a support system attached, in particular to a platform, within the tower, wherein the support system is adapted to support the upper portion of the cable loop curved at a bending radius greater than a minimum bending radius of the cable.

The support system may or may not be attached or installed at a platform. The support system may for example also be attached at a wind turbine tower wall without being attached to a platform. When the support system is attached to a platform, advantageously, maintenance personnel can assist during the method, in particular during fixing the upper portion of the cable loop at the support system. The support system may comprise one or more structures or elements which are geometrically configured such as to ensure that the power cable cannot be supported or fixed to the support structure if the curvature radius or radius of curvature is smaller than the minimum bending radius of the cable or minimum curvature radius of the cable. Thereby, integrity of the power cable may be maintained and ensured. Fixing the upper portion of the cable loop at the support system may prevent that the cable falls down the tower and may ensure that the cable is secured during transportation for example. Furthermore, the geometry of the upper portion of the cable loop may be defined by the geometry and construction of the support system.

According to an embodiment of the present invention, fixing the cable portion of the cable loop at the support system is performed using one or more clamps, the support system in particular including plural bars inclined to each other and connected to each other. The clamp may engage a section of the cable forming the upper portion of the cable loop and also engage with one or more bars or rigid structures of the support system. For example, 5 to 10 or 5 to 20 clamps may be provided for fixing the cable section or cable portion forming the upper portion of the cable loop to the support system. The support system may comprise plural for example straight bars which are connected to each other. The support system may further comprise stiffener, struts or the like for enforcing the support system or improving the rigidity of the support system. Thereby, secure fixation of the upper portion of the cable loop may be provided.

According to an embodiment of the present invention, the method further comprises arranging a lower portion of the cable loop below the support system, in particular platform, the cable loop in particular including a cable turn of 360°.

The lower portion of the cable loop may be the portion of the cable loop which is adaptable or changeable regarding its size, in particular its vertical extent. The lower portion of the cable loop may essentially hang down from the platform or the support system. The lower portion of the cable loop may not be supported by other support elements. The lower portion of the cable loop may hang free in a space within the turbine tower below the platform at which for example the support system is installed or attached. Thereby, storing of a relatively long excess cable portion is enabled.

According to an embodiment of the present invention, arranging the section of the cable within the tower comprises attaching an auxiliary lifting string at a first attachment region, in particular at or close to an end of the cable; using a lifting apparatus, in particular hoisting winch, further in particular installed at a top platform within the tower, to draw the auxiliary lifting string together with a part of the cable from a lower region within the tower upwards.

The auxiliary lifting string may for example comprise a steel wire having attached thereon a Chinese finger forming kind of a net which engages a portion of the cable in particular at the first attachment region. Usage of the auxiliary lifting string may enable to draw the cable from a bottom of the tower, for example from a cable drum upwards. The top platform of the tower may for example be the uppermost platform within the wind turbine tower which may be located close to an upper end of the wind turbine tower. Conventionally, a lifting apparatus may be installed at the top platform. Thereby, the method may support conventional wind turbine tower configurations.

Forming the cable loop can be performed in different manners as explained below.

According to a first embodiment forming the cable loop comprises, while further drawing the auxiliary lifting string, guiding the excess cable portion to an outside of the tower; fixing the cable inside the tower; retracting the excess cable portion from the outside into the inside of the tower.

After the lifting apparatus has drawn a cable portion having a length essentially equal to the height of the tower, the drawing at the auxiliary lifting string may continue to guide the excess cable portion to an outside of the tower. Guiding the excess cable portion to an outside of the tower prepares for actually forming the cable loop. Since the power cable may have a relatively high diameter, it may not be possible to temporarily store the excess cable portion on a top platform or any other platform within the wind turbine tower. Thus, it may be necessary to guide the excess cable portion to the outside of the tower to prepare for the forming of the cable loop. Then, the cable may be fixed inside the tower. In particular, a portion of the cable between the bottom of the tower and the support system (or the platform at which the support system is attached) may be fixed to the tower wall. Thereby, that lower portion of the power cable below the support system or the platform at which the support system is attached is prevented from moving during actually forming the cable loop. After fixing the cable inside the tower, the excess cable portion is retracted from the outside into the inside of the tower. Retracting the excess cable portion and forming the cable loop may then be performed simultaneously as described in more detail below.

According to a second embodiment of forming the loop, forming the loop comprises attaching the auxiliary lifting string at a second attachment region of the cable farther away from the end of the cable than the first attachment region; drawing the auxiliary lifting string together with the cable upwards thereby keeping the cable portion between the second attachment region and the end of the cable within the tower.

According to this second embodiment of forming the loop, the excess portion is not guided to an outside of the wind turbine tower. Instead (in particular having drawn the upper end of the cable to at least the support system or the platform at which the support system is attached) the attachment region at which the auxiliary lifting string is attached to the power cable is shifted or changed from the first attachment region to the second attachment region which is farther away from the end of the cable than the first attachment region. Thereby, it is enabled to further draw the cable upwards however keeping the entire cable during the drawing within the wind turbine tower. Thus, no cable portion is guided to an outside of the tower in this second embodiment.

To both the first embodiment and the second embodiment of forming the cable loop applies: supporting a part of the cable, which in particular is above the platform, by the support structure, thereby forming the upper portion of the cable loop.

Thereby, the part of an excess cable portion is supported by the support structure while either the excess cable portion is retracted from the outside into the inside of the tower (according to the first considered embodiment) or while further drawing the auxiliary lifting string attached to the second attachment region (according to the second described embodiment of forming the cable loop). Thereby, the part of the cable portion which finally forms the upper portion of the cable loop is secured. Afterwards, the retracting the excess cable portion from the outside into the inside of the tower may continue (according to the first described embodiment of forming the cable loop). The supporting the part of the cable portion (according to the second described embodiment) may only be performed after having drawn the auxiliary lifting string attached to the second attachment region upwards such that the second attachment region essentially is arranged close to the support structure or the platform at which the support structure is attached. In other embodiments of the second embodiment of forming the cable loop, the attachment region may be shifted or changed several times depending on the length of the required excess cable portion length.

According to an embodiment of the present invention, forming the cable loop further comprises lowering another part of the cable through an opening, in particular slit, in the platform below the platform, to form the lower portion of the loop, in particular having a 180° bend below the platform.

Herein, lowering the other part of the cable through the opening may, for the second described embodiment of forming the loop, be performed while drawing the auxiliary lifting string attached to the second attachment region. Furthermore, for the first embodiment of the forming the cable loop, also the lowering the other part of the cable through the opening may be performed during retracting the excess portion from the outside into the inside of the tower. Thus, the lowering the other part of the cable through the opening may be performed either (for the first embodiment) while retracting the excess cable portion from the outside into the inside of the tower or (for the second embodiment) during drawing the auxiliary lifting string attached at the second attachment region.

According to an embodiment of the present invention, the method further comprises fixing a further part of the cable above the platform within the tower. The further part of the excess cable portion may be a part at or close to the end of the cable which is not comprised in the cable loop and which is not comprised in cable portions located below the platform at which the support system is attached. The fixing step of fixing the further part of the cable above the platform within the tower may be performed after having formed the cable loop, for example at an end of the installation method.

According to an embodiment of the present invention, the method further comprises fixing the cable from the bottom of the tower to the platform. Also, this fixing step may be performed after having formed the cable loop while the entire cable is located within the wind turbine tower. Thereby, the cable may safely be secured, for example for transportation.

According to an embodiment of the present invention, the method further comprises, after forming the cable loop, essentially closing the elongate opening in the platform leaving two cable openings through which two cable portions between the upper portion of the cable loop and the lower portion of the cable loop run. Thereby the method is in particular performed before transporting the tower with installed cable to a wind turbine operation site.

The opening may have a slit form having a length for example between 0.5 and 1.0 of the diameter of the wind turbine tower. Thereby, lowering the cable partly through the slit may be simplified. To avoid maintenance personnel falling through the slit, the slit or in general the opening may be closed, for example by a cover. In particular, closing the opening is performed after having formed the cable loop or even already after having guided a portion of the cable through the slit. Even after closing the opening, the vertical extent of the lower portion of the cable loop may be changed, in particular increased or decreased, since the cable run through the two cable openings allowing shifting the cable through these openings. Thereby, security requirements may be met.

After the cable loop is formed and the respective cable portions are fixed or secured at the tower or tower walls, the tower having installed the power cable may be transported to an operation site for example.

According to an embodiment of the present invention, the method further comprises, in particular after installation of a nacelle on top of the tower at the wind turbine operation site: drawing the cable end upwards, in particular by a distance from a nacelle attachment region at the top of the tower to an electrical power output terminal of the nacelle, thereby in particular maintaining the upper portion of the cable loop unchanged, thereby changing the size of the cable loop, in particular the lower portion of the cable loop.

Thereby, it is enabled to electrically connect the cable to the respective power output terminal of the nacelle (in particular the transformer or generator or converter). When drawing the cable end upwards, the vertical size of the lower portion of the cable loop may be changed, in particular decreased. It may not be required to change the fixation of the upper portion of the cable loop at the support structure and it may also not be necessary to unfix or change the fixing of the cable portion below the support structure during drawing the excess cable portion into the nacelle. Thereby, the final installation step may be simplified. For drawing the cable end upwards towards the nacelle, a hoisting equipment may also be installed within the nacelle, i.e. at a location higher than the uppermost platform of the wind turbine tower.

According to an embodiment of the present invention, the method further comprises electrically connecting an end of the cable with the power output terminal at the nacelle; and/or electrically connecting another end of the cable with a sea cable or underground cable. Thereby, the installation of the wind turbine at the installation or operation site may be completed.

It should be understood that features, individually or in any combination, disclosed, described, explained or provided for a method of installing a power cable in a wind turbine tower, may also be applied to, individually or in any combination, to an arrangement for installing a power cable in a wind turbine tower, according to embodiments of the present invention and vice versa.

According to an embodiment of the present invention it is provided a wind turbine tower including an arrangement for installing a power cable in the wind turbine tower, in particular for transportation, the arrangement comprising: a support system installed within the tower adapted to support a section of a cable within the tower, the section having a length greater than the tower height by an excess cable portion, in a form of a cable loop within the tower, wherein an angle enclosed between a normal of a cable loop plane and the longitudinal direction of the tower is between 70° and 110°.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
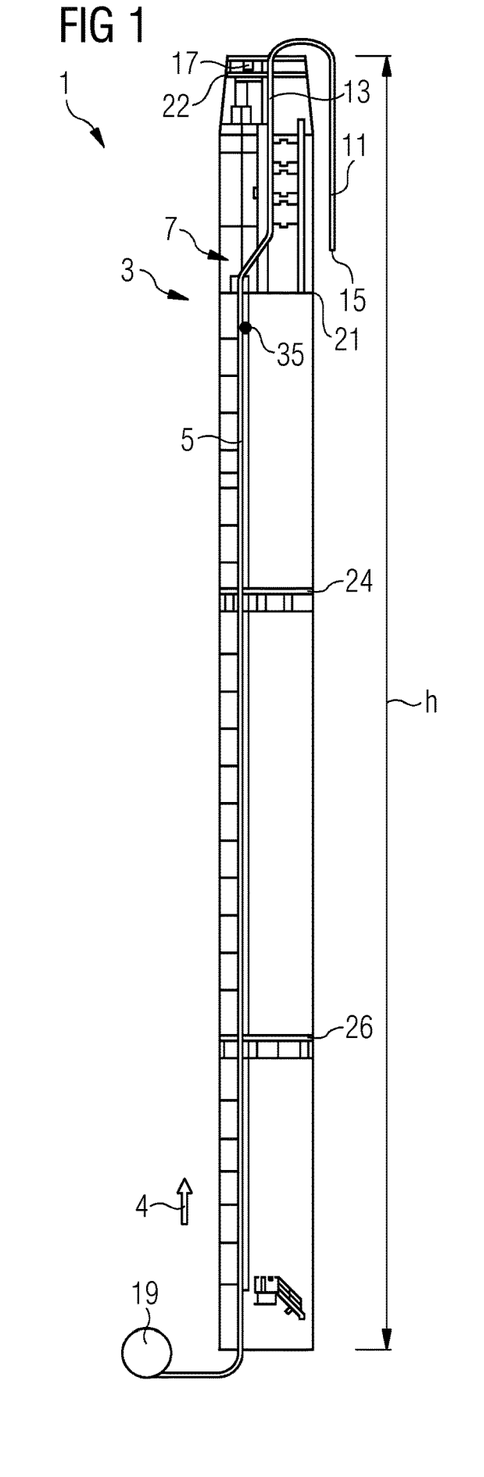
FIG. 1 schematically illustrates a wind turbine tower including an arrangement for installing a power cable in the wind turbine tower according to an embodiment of the present invention at different method steps of a method of installing a power cable in the wind turbine tower according to an embodiment of the present invention.
Figure 2:
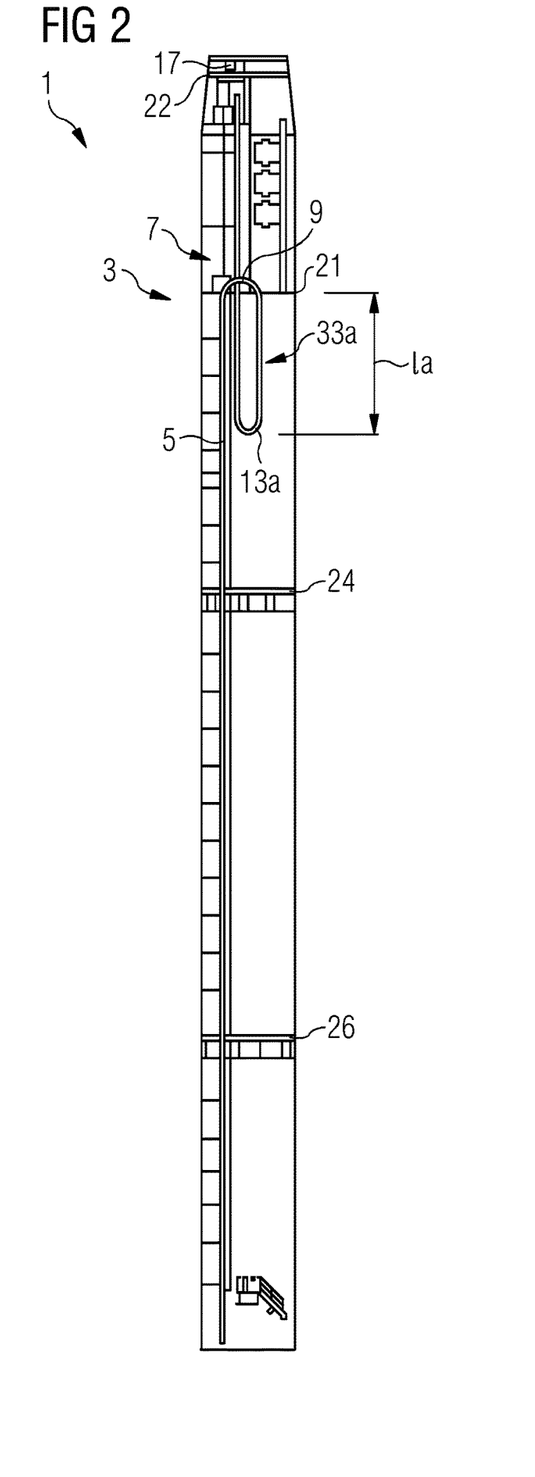
FIG. 2 schematically illustrates a wind turbine tower including an arrangement for installing a power cable in the wind turbine tower according to an embodiment of the present invention at different method steps of a method of installing a power cable in the wind turbine tower according to an embodiment of the present invention.
Figure 3:
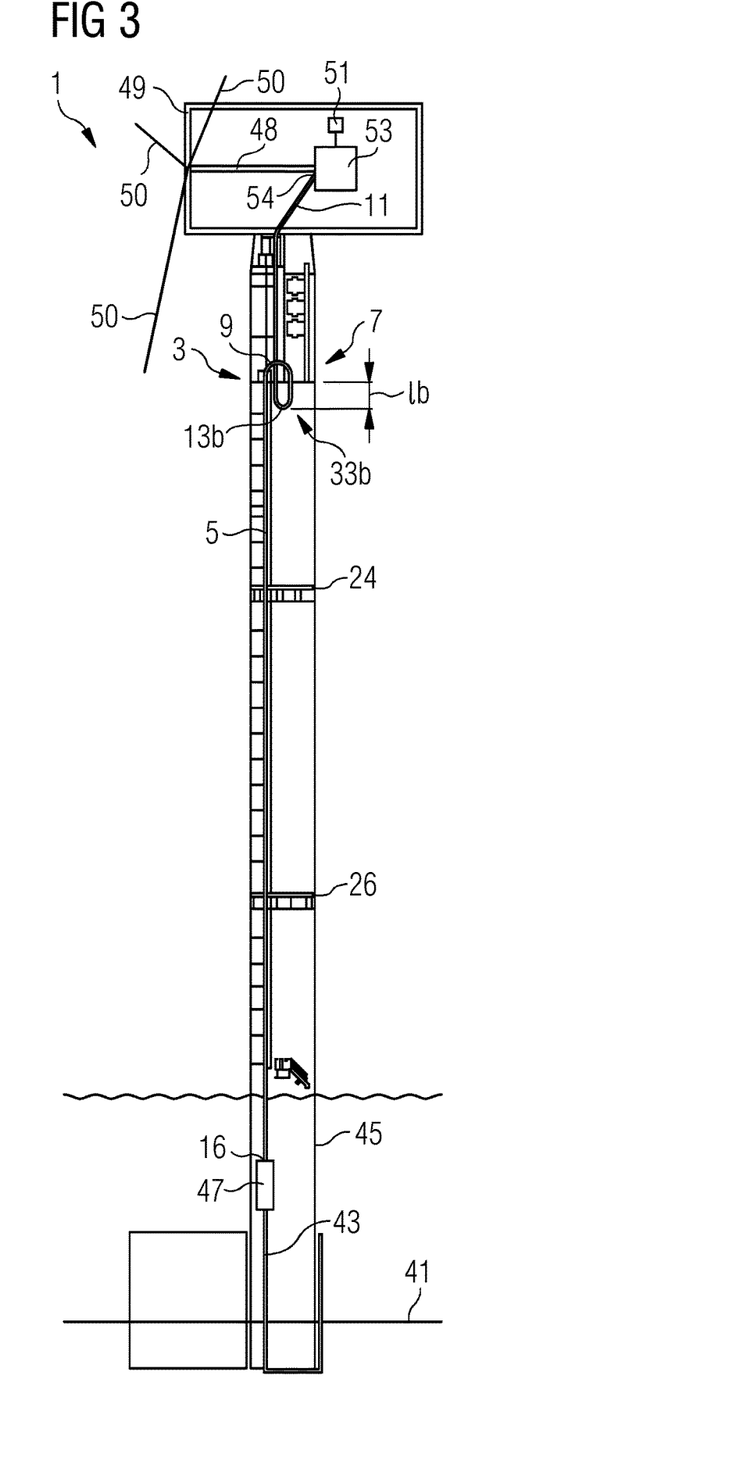
FIG. 3 schematically illustrates the wind turbine tower illustrated in FIGS. 1 and 2 at a last installation step of a method of installing a power cable in the tower according to an embodiment of the present invention.

The wind turbine towers 1 illustrated in a schematic manner in FIGS. 1 to 3 according to an embodiment of the present invention are illustrated during different stages of an installation method of a power cable according to embodiments of the present invention.

The wind turbine tower 1 comprises an arrangement 3 for installing a power cable 5 in the wind turbine tower 1. Thereby, the arrangement 3 comprises a support system 7 which is illustrated in more detail in FIGS. 4, 5 and 6 and will be explained below. The support system 7 is adapted to support a part 9 of a cable section 5 within the tower 1, the cable section 5 having a length greater than the tower height h by an excess cable portion 11, in a form of a cable loop (comprising portions 27 and 33, see FIG. 4) within the tower 1.

During performing the method of installing the power cable 5 in the wind turbine tower 1, a not illustrated auxiliary lifting string has been attached to a first attachment region 13 which may be apart from an end 15 of the cable 5 by at least the length of excess cable portion 11. A lifting apparatus, in particular hoisting winch 17 (e.g., installed at a top platform 22) in a beginning of the installation method draws the cable 5 from a drum 19 (located at the bottom of the tower 1) upwards such that the first attachment region 13 is drawn to be slightly below the hoisting winch 17. While drawing the cable upwards, the excess cable portion 11 is guided to an outside of the tower 1. In a next method step, the cable 5 is fixed inside the tower, in particular fixed in a region from the bottom of the tower 1 to a platform 21 which is also referred to as support system platform 21 in the following.

In a next method step illustrated in FIG. 2, the excess cable portion 11 is retracted from the outside into the inside of the tower 1. Furthermore, a part 9 of the cable 5 is supported by the support structure 7, as is illustrated for example in FIG. 4. Using clamps 23, the part 9 of the cable is fixed to the support structure 7. In particular, the support structure 7 comprises plural bars 25 which are connected to each other and configured to support the cable part 9 such that the minimum curvature radius is not undercut and such that the cable is not curved to a larger degree than permitted. While the part 9 of the cable 5 is supported by the support structure 7, an upper portion 27 of the cable loop is formed. While further retracting the excess cable portion 11 from the outside of the tower to the inside of the tower, another part 13a of the cable 5 is lowered through an opening which is labelled in FIG. 5 with reference sign 29 in a platform 31 at which the support structure 7 is attached. By lowering the part 13, a lower portion 33a of the cable loop is formed.

The support system platform 21 is installed in an upper half of the wind turbine tower and has installed thereon the support structure 7. The platform 21 illustrated in FIG. 5 essentially is comprised of a circular metal plate which is oriented horizontally within the wind turbine tower 1. A number of bars 25 forming the support structure 7 supports the part 9 of the cable above the support system platform 21 to be in a defined geometry, thereby forming the upper portion 27 of the cable loop.

Figure 5:
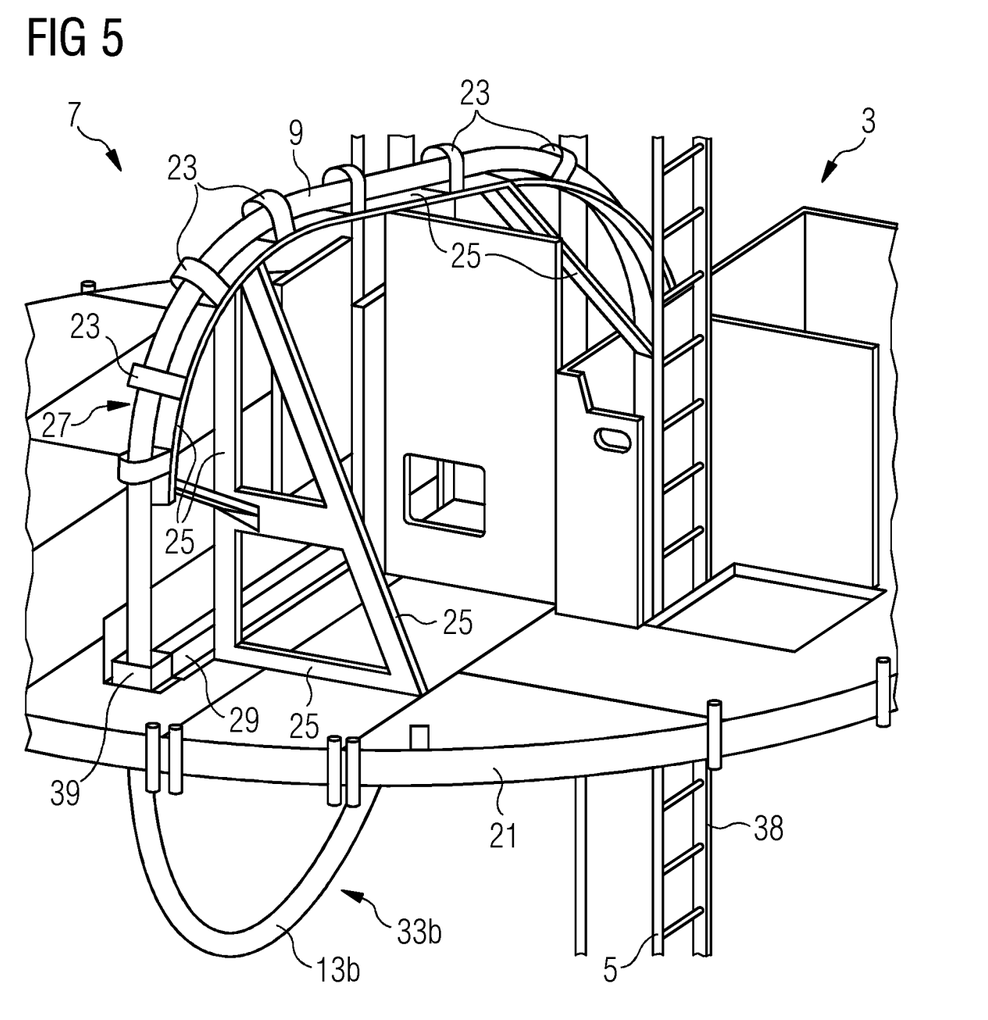
FIG. 5 schematically illustrates a platform and a support system as employed in embodiments according to the present invention.

In FIG. 5, the elongate opening or slit 29 is not covered by a cover such that the part 13 of the cable 5 can be lowered through the slit and thus passing the platform 21. In a ladder-like frame 38, the cable 5 is drawn upwards from the bottom of the tower and is then guided along some of the bars 25 of the support system 7.

Figure 6:
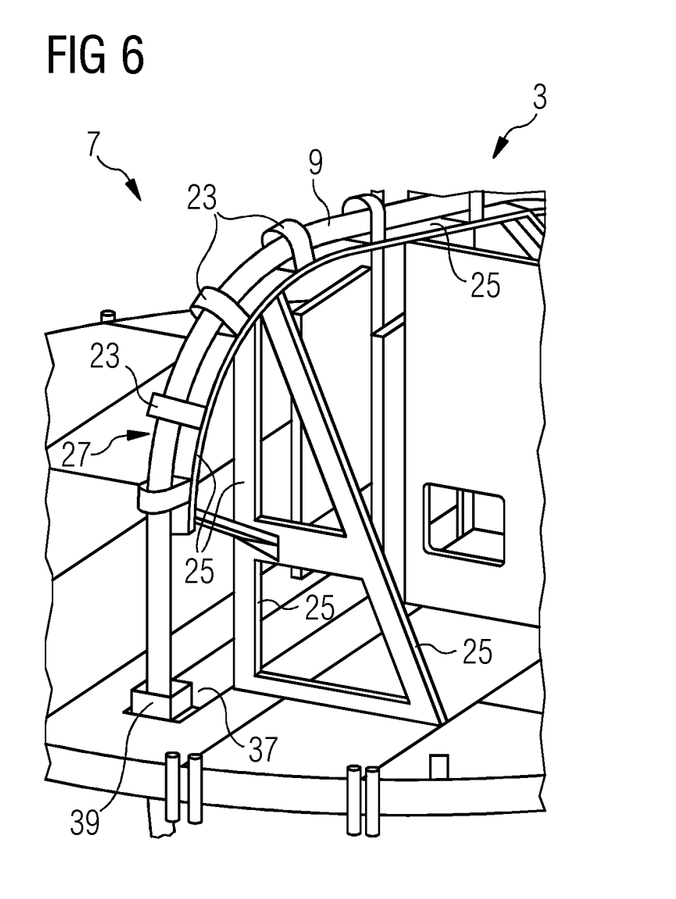
FIG. 6 schematically illustrates a platform and a support system as employed in embodiments according to the present invention.

In FIG. 6, the situation is illustrated, in which the elongate opening 29 is closed by a cover 37. The cover 37 however leaves open two cable openings 39 through which the cable 5 runs from which only one cable opening 39 is illustrated in FIGS. 5 and 6.

Figure 4:
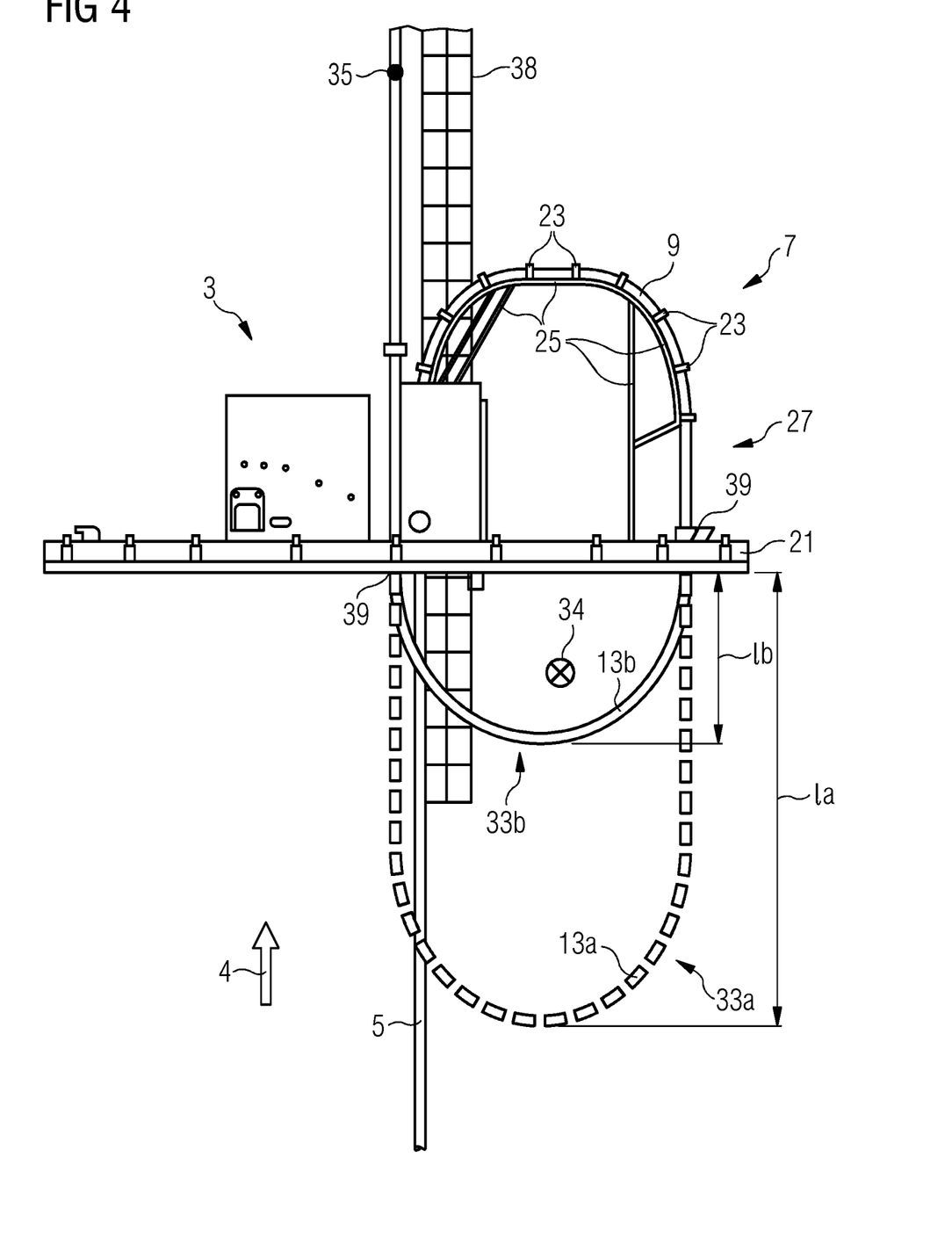
FIG. 4 schematically illustrates a portion of a wind turbine tower according to an embodiment of the present invention.

FIG. 4 schematically illustrates a portion of the wind turbine tower including the support system platform 21 and the support system 7 in a side view. The cable 5 runs from the bottom in the vertical direction 4 upwards and is guided and supported by the support structure 7 comprising the bars 25. Thus, above the platform 21, the upper portion 27 of the cable loop including the part 9 of the cable is formed. The cable then runs through the cable openings 39 to form also the lower portion 33a of the cable loop formed by the cable part 13.

In FIG. 4 it is illustrated that the lower portion 33a, 33b of the cable loop may have different vertical sizes or extensions. Namely, the lower portion 33a formed by the cable part 13a has a vertical extension 'la' and the lower portion 33b of the cable loop formed by the cable part 13b has a vertical extension or vertical size 'lb' being smaller than the vertical size 'la'. In particular, starting from the larger lower portion 33a of the cable loop, the cable may be drawn upwards, for example by drawing at a second attachment region 35, thereby sliding the cable through one of the cable openings 39 (in particular a central cable opening located close to the center of the tower), thereby continuously decreasing the size of the lower portion 33a of the cable loop until the lower portion 33b of the cable loop is formed. The vertical direction 4 corresponds to the longitudinal direction of the tower 1.

As can be taken from FIG. 4 for example, the normal 34 of the cable loop (formed by the upper portion 27 and the lower portion 33) is essentially perpendicular to the longitudinal direction 4 of the turbine tower. In particular, an angle enclosed between the normal 34 of the cable loop 27, 33 and the longitudinal direction 4 of the tower may be between 70° and 110°.

FIG. 3 illustrates an installation step of an installation method after the wind turbine tower has been transported to a final operation site and erected for example at a seabed 41 in which for example a sea cable 43 is buried. In a basement region 45, a power connector 47 is located which allows to electrically connect (an end of) the cable 5 installed within the tower 1 to the sea cable 43.

In FIG. 3, a nacelle 49 has been installed on top of the wind turbine tower, the nacelle 49 harbouring a rotor with rotor 48 blades 50. The nacelle 49 also comprises a hoisting winch 51 which allows a portion of the excess portion 11 to be drawn into the nacelle 49 in order to electrically connect the cable 5 to a power terminal 54 of a transformer or generator and/or converter 53 which is harboured within the nacelle and which is driven by rotating a not illustrated rotor having mounted thereon plural rotor blades.

As can be appreciated from FIGS. 2 and 3, the size of the lower portion 33 has decreased, similarly as illustrated in FIG. 4 from 'la' to 'lb'.

Embodiments of the present invention store the cable loop for practical reasons and technical requirements by supporting it at a cable loop platform (also referred to as support system platform 21) instead at a top platform 22 which is located close to the top of the turbine tower. The high voltage cable may be pulled up to the tower top and out of the tower until a sufficient length can be provided. Afterwards, the cable 5 may be fixed from underneath the cable loop 33 until the bottom. By lowering down the high voltage cable 5 between the cable loop and the tower top, the section of the cable forming the loop size increases. After placing the nacelle on top of the tower (as illustrated in FIG. 3), the high voltage cable can be pulled up and connected to the transformer/generator/converter 53 which reduces the size of the cable loop, in particular the lower portion 33b of the cable loop. Requirements of cable size diameter may lead to complication between the minimum bending radius of the cable and the provided space in the tower. Therefore, the storage of the overlength (or excess portion of the cable) in the cable loop and the assembly and installation procedure may also support relatively high diameter cables.

Additionally, the option to pull the cable subsequently to the nacelle installation from the cable loop and through the tower internal components in the tower top provide advantages. To realize that, guiding rollers, one or more cable brakes and adjustable fixation tools may be installed at different portions of the tower, such as at different platforms, such as platform 21, 22, 24, 26. Furthermore, the cable 5 may be protected by metal rings placed around the cable.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of installing a power cable in a wind turbine tower, the method comprising:
arranging a section of the cable within the tower, the section having a length, greater than the tower height, by forming a cable loop within the tower, wherein an angle enclosed between a normal of a cable loop plane and the longitudinal direction of the tower is between 70° and 110°,
wherein forming the cable loop comprises lowering another part of the cable through an opening in a platform to form a lower portion of the cable loop.

2. The method according to claim 1, further comprising:
fixing an upper portion of the cable loop at a support system attached, within the tower, wherein the support system is adapted to support the upper portion of the cable loop curved at a bending radius greater than a minimum bending radius of the cable.

3. The method according to claim 2, wherein fixing a cable part at the support system is performed using one or more clamps.

4. The method according to claim 1, further comprising:
arranging the lower portion of the cable loop below a support system.

5. The method according to claim 1, wherein arranging the section of the cable within the tower comprises:
attaching an auxiliary lifting string at a first attachment region of the section of the cable;
using a lifting apparatus to draw the auxiliary lifting string together with a part of the cable from a lower region within the tower upwards.

6. The method according to claim 1, wherein forming the cable loop comprises:
further drawing the auxiliary lifting string guiding an excess cable portion to an outside of the tower;
fixing the cable inside the tower;
retracting the excess cable portion from the outside into the inside of the tower.

7. The method according to claim 5, wherein forming the cable loop comprises:
attaching the auxiliary lifting string at a second attachment region of the cable farther away from an end of the cable than the first attachment region;
drawing the auxiliary lifting string together with the cable upwards thereby keeping the cable portion between the second attachment region and the end of the cable within the tower.

8. The method according to claim 6, wherein forming the cable loop further comprises:
supporting a part of the cable, by the support structure, thereby forming an upper portion of the cable loop.

9. The method according to claim 1, wherein
the lower portion of the loop has a 180° bend below the platform.

10. The method according to claim 1, further comprising:
fixing a further part of the cable above the platform within the tower.

11. The method according to claim 1, further comprising:
fixing the cable from the bottom of the tower to the platform.

12. The method according to claim 1, further comprising, after forming the cable loop:
essentially closing the opening in the platform leaving two cable openings through which two cable portions between an upper portion of the cable loop and the lower portion of the cable loop run.

13. The method according to claim 1, further comprising:
drawing a cable end upwards, thereby changing the size of the cable loop.

14. The method according to claim 1, further comprising:
electrically connecting an end of the cable with a power output terminal at the nacelle; and/or
electrically connecting another end of the cable with a sea cable or underground cable.

15. A wind turbine tower including an arrangement for installing a power cable in the wind turbine tower, the arrangement comprising:
a support system attached to a platform within the tower and installed within the tower and adapted to support a section of a cable within the tower, the section having a length greater than the tower height by an excess cable portion, in a form of a cable loop within the tower, wherein an angle enclosed between a normal of a cable loop plane and the longitudinal direction of the tower is between 70° and 110°,
wherein the platform has an opening allowing, for forming the cable loop, to lower another part of the cable through the opening in a platform to form a lower portion of the cable loop.

16. The wind turbine tower according to claim 15, wherein the lower portion of the cable loop has a 180° bend below the platform.

* * * * *